United States Patent
Gum et al.

(10) Patent No.: US 6,477,390 B1
(45) Date of Patent: Nov. 5, 2002

(54) APPARATUS AND METHOD FOR INTUITIVE AUDIO KEYPAD NAVIGATION FOR A WIRELESS COMMUNICATION DEVICE

(75) Inventors: Arnold J. Gum, San Diego, CA (US); Jason B. Kenagy, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/407,162

(22) Filed: Sep. 28, 1999

(51) Int. Cl.⁷ .............................. H04M 1/00; H04D 7/00
(52) U.S. Cl. .................... 455/550; 455/464; 455/422; 379/361; 379/359
(58) Field of Search .................... 455/550, 556, 455/557, 558, 575, 38.5, 38.2, 38.1; 84/609; 379/361, 368, 362, 364, 69, 77, 82, 83, 355, 356, 359

(56) References Cited

U.S. PATENT DOCUMENTS

| | | | | | |
|---|---|---|---|---|---|
| 4,519,044 A | * | 5/1985 | Munetsugu | ................. | 708/134 |
| 4,700,377 A | * | 10/1987 | Yasuda et al. | ........... | 379/88.16 |
| 4,922,527 A | | 5/1990 | Nonami | ..................... | 379/361 |
| 5,186,471 A | * | 2/1993 | Vancraeynest | .............. | 463/41 |
| 5,343,510 A | * | 8/1994 | Fukai | .......................... | 455/550 |
| 5,384,807 A | * | 1/1995 | Yatime et al. | ............... | 375/244 |
| 5,392,348 A | * | 2/1995 | Park et al. | .................. | 379/386 |
| 5,491,745 A | * | 2/1996 | Roeder | ................. | 379/355.09 |
| 5,557,671 A | | 9/1996 | Endoh | ....................... | 379/355 |
| 5,739,759 A | * | 4/1998 | Nakazawa et al. | ......... | 340/7.62 |
| 6,014,441 A | * | 1/2000 | Mark | ........................ | 379/361 |
| 6,233,323 B1 | * | 5/2001 | Ali et al. | ................ | 379/93.27 |

FOREIGN PATENT DOCUMENTS

| | | | | |
|---|---|---|---|---|
| EP | 0615371 | 11/1993 | ........... | H04M/1/72 |
| EP | 0982910 | 8/1999 | ........... | H04M/1/23 |
| FR | 2769781 | 10/1997 | ........... | H04M/7/32 |
| GB | 2261574 | 5/1993 | ........... | H04M/1/23 |
| GB | 2292499 | 8/1994 | ........... | H04M/1/56 |
| GB | 2292499 A | * 8/1994 | | |
| WO | 9619069 | 6/1996 | ........... | H04M/1/72 |

\* cited by examiner

*Primary Examiner*—Nay Maung
*Assistant Examiner*—Joy K. Contee
(74) *Attorney, Agent, or Firm*—Philip R. Wadsworth; Charles D. Brown; Howard H. Seo

(57) ABSTRACT

A wireless communication device (101) having intuitive audio keypad navigation features is provided. Each of the keys (140–151) of a keypad (132) of the wireless communication device (101) is assigned a different audible signal (FIGS. 3–4). When a user of the wireless communication device (101) presses one of the keys (140–151), a processor (112) responds by triggering an output driver (124). The output driver (124) generates a unique output signal corresponding to the pressed key (140–151). A speaker (122) or alert circuit (126) is responsive to the triggering of the output driver (124) to generate a unique audible signal (FIGS. 3–4) associated with the unique output signal of the pressed key (140–151). In this manner, an audio feedback is provided to the user that uniquely identifies each of the keys (140–151) as they are pressed.

3 Claims, 3 Drawing Sheets

| | | |
|---|---|---|
| 170 | VOLUME CONTROL | VOLUME-VARYING TONE | 174 |
| 172 | RINGER SELECTOR | RINGER TONES | 176 |
| 118 | STORED TELEPHONE NOS. | UNIQUE TONES OR FIGURE 3 | 178 |
| 146 | POWER | UNIQUE TONE | 180 |
| 148 | FUNCTION | UNIQUE TONE | 182 |
| 150 | SEND | UNIQUE TONE | 184 |
| 151 | END | UNIQUE TONE | 185 |
| 140 | 1 - 9 | 1 - 9 BEEPS | 186 |
| 140-144 | 0 - 9, #, * | KEY NAME | 188 |

FIG. 3

| | ONE BEEP | TWO BEEPS | THREE BEEPS |
|---|---|---|---|
| HIGH TONE | 1 | 2 | 3 |
| MEDIUM TONE | 4 | 5 | 6 |
| LOW TONE | 7 | 8 | 9 |
| RISING TONE | | * | |
| LONG TONE | | 0 | |
| FALLING TONE | | # | |

152 — ONE BEEP
154 — TWO BEEPS
156 — THREE BEEPS
140 — (1,2,3,4,5,6,7,8,9)
142 — *
143 — 0
144 — #
158 — HIGH TONE
160 — MEDIUM TONE
162 — LOW TONE
164 — RISING TONE
166 — LONG TONE
168 — FALLING TONE

FIG. 4

| | |
|---|---|
| VOLUME CONTROL | VOLUME-VARYING TONE |
| RINGER SELECTOR | RINGER TONES |
| STORED TELEPHONE NOS. | UNIQUE TONES OR FIGURE 3 |
| POWER | UNIQUE TONE |
| FUNCTION | UNIQUE TONE |
| SEND | UNIQUE TONE |
| END | UNIQUE TONE |
| 1 - 9 | 1 - 9 BEEPS |
| 0 - 9, #, * | KEY NAME |

170 — VOLUME CONTROL
172 — RINGER SELECTOR
118 — STORED TELEPHONE NOS.
146 — POWER
148 — FUNCTION
150 — SEND
151 — END
140 — 1 - 9
140-144 — 0 - 9, #, *
174 — VOLUME-VARYING TONE
176 — RINGER TONES
178 — UNIQUE TONES OR FIGURE 3
180 — UNIQUE TONE
182 — UNIQUE TONE
184 — UNIQUE TONE
185 — UNIQUE TONE
186 — 1 - 9 BEEPS
188 — KEY NAME

APPARATUS AND METHOD FOR INTUITIVE AUDIO KEYPAD NAVIGATION FOR A WIRELESS COMMUNICATION DEVICE

FIELD OF THE INVENTION

The present invention is related generally to wireless communication devices, and more particularly, to an apparatus and method for intuitive audio keypad navigation for a wireless communication device.

BACKGROUND OF THE INVENTION

Wireless communication devices, such as cellular telephones, are very popular. They allow a user to send and receive telephone calls from virtually any location. Cellular telephones also have features not found in conventional land-line telephones. For example, cellular telephones often have a display that shows information, such as a telephone number being entered by the user, contents of a telephone directory or address book stored in the cellular telephone, and various menu items indicating operational settings of the cellular telephone. Thus, the display provides convenience to the user.

As with conventional telephones, cellular telephones may also have audible signals that are played whenever a button (e.g., a key) on a keypad of the cellular telephone is pressed. That is, as the user uses the keypad to dial the digits of a destination telephone number, a "beep" is played to indicate to the user that a key has been pressed. However, these beeps are nothing more than indistinguishable monotones. In certain situations, such as operation during darkness, when the user is driving a vehicle, or in other situations where the user's attention is occupied, these beeps provide no assurance to the user that a telephone number has been successfully entered and dialed. Because all of the beeps sound alike, it is impossible to tell whether a "1," a "2," or other digits in the same approximate location on the keypad have been pressed. This disadvantage of conventional telephones and conventional cellular telephones is particularly troublesome for users who are blind or in sight-impaired situations. Therefore, it can be appreciated that there is a significant need to provide a wireless communication device that can be operated without having to rely upon visual identification of particular keys on the keypad. The present invention provides this and other advantages as will be apparent from the following detailed description and accompanying figures.

SUMMARY OF THE INVENTION

An embodiment of the present invention provides a wireless communication device comprising a keypad having a plurality of keys. A processor is coupled to the keypad, and an output driver is coupled to the processor, with the processor responsive to activation of the plurality of keys by a user to trigger the output driver to generate a unique output signal corresponding to each of the plurality of keys. An audio output device is responsive to a triggering of the output driver and provides audible signals corresponding to the unique output signal. User activation of a selected one of the plurality of keys results in a generation of a unique audible signal corresponding to the activated key.

In one embodiment, the audible signal comprises a key name associated with the activated key. In another embodiment, the audible signals comprise a number of tones, with the number of tones corresponding to a numerical value of an associated key. In yet another embodiment, the audible signals comprise one of a high, medium, low, rising, falling, or long tone.

The wireless communication device can further comprise a volume control to change a speaker volume of the wireless communication device. The output driver generates an associated output signal corresponding to the volume control and alters the associated output signal if the volume control is changed by the user. The wireless communication device also can further comprise an alert circuit structured to provide a plurality of user-selectable alerts. The output driver generates different output signals corresponding to the user-selectable alerts. Yet another embodiment of the wireless communication device further comprises a memory storing a plurality of telephone numbers. The output driver generates a unique output signal corresponding to each of the telephone numbers.

One embodiment of the present invention provides a method of operating a wireless communication device. The method comprises providing a keypad having a plurality of keys, activating one of the plurality of keys, generating a unique output signal corresponding to the one key and in response to activation of the one key, and responding to the unique output signal by providing a unique audible signal corresponding to the activated key.

Yet another embodiment of the present invention provides a computer-readable medium having stored thereon a data structure for a wireless communication device, with the wireless communication device including a keypad having a plurality of keys. The data structure comprises a plurality of data fields corresponding to the plurality of keys, with each of the data fields containing data representing a unique sound associated with each of the plurality of keys, and a selector data field to select one of the plurality of data fields in response to user activation of the associated one of the plurality of keys.

BRIEF DESCRIPTION OF THE DRAWINGS

FIG. 3 is a table identifying illustrative audible signals for the wireless communication device and keypad shown in FIGS. 1–2.

FIG. 4 is table identifying additional illustrative audible signals for the wireless communication device and keypad shown in FIGS. 1–2.

In the figures, like reference numerals refer to like parts throughout the various views, unless otherwise indicated.

DETAILED DESCRIPTION OF THE PREFERRED EMBODIMENTS

Embodiments of the present invention provide a wireless communication device that allows intuitive audio keypad navigation. This audio keypad navigation substantially eliminates a need to visually rely on a keypad or on a display screen of the wireless communication device, and makes operation of the wireless communication device dramatically more convenient.

Figure 1:
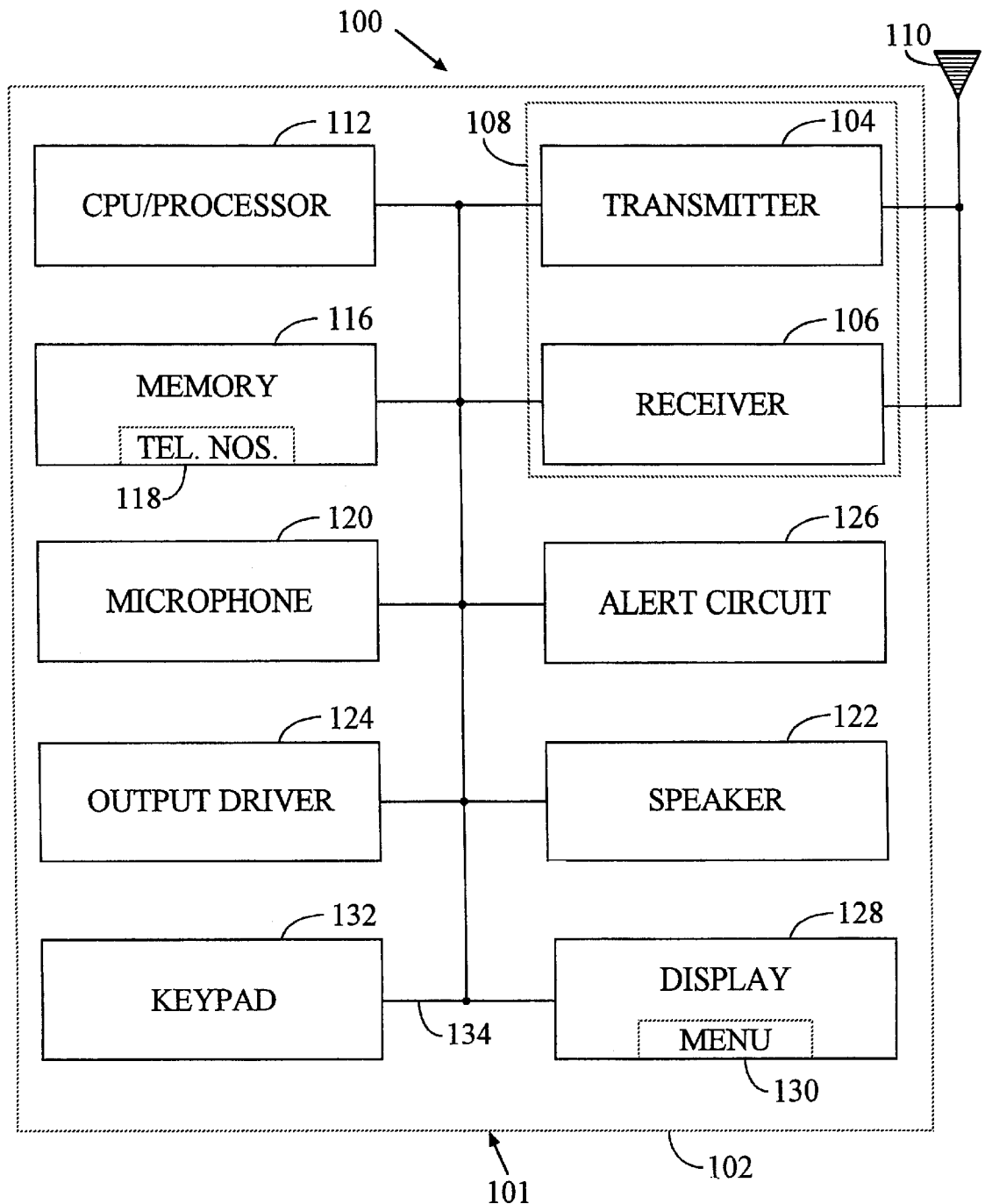
FIG. 1 is a functional block diagram of an embodiment of a wireless communication device of the present invention.

The present invention is embodied in a system 100 illustrated in the functional block diagram of FIG. 1. The system 100 is incorporated into a wireless communication device 101, which may be embodied in a cellular telephone. The system 100 includes a housing 102 that contains a transmitter 104 and a receiver 106 to allow transmission and reception of data, such as audio communications, between the system 100 and a remote location, such as a cell site controller (not shown). The transmitter 104 and the receiver 106 may be combined into a transceiver 108. An antenna 110 is attached to the housing 102 and is electrically coupled to the transceiver 108. The operation of the transmitter 104, receiver 106, and antenna 110 is well known in the art and need not be described herein. Although described herein as a cellular telephone, the principles of the present invention are applicable to a variety of wireless communication devices including, but not limited to, cellular/PCS, radio telephone, conventional radio, and the like. Accordingly, the present invention is not limited by the specific form of wireless communication device.

The wireless communication device 101 also includes a central processing unit (CPU) 112 or "processor," which controls operation of the system 100. The CPU 112 may perform all the tasks involved in the operation of the system 100, or only a portion of them, where the remaining tasks are delegated to other processing units included in the system 100.

The wireless communication device 101 further includes a computer-readable medium, such as memory 116, which may include both read-only memory (ROM) and random access memory (RAM). A portion of the memory 116 may also include non-volatile random access memory to store information that must be present upon powering the wireless communication device 101. The memory 116 is generally used to store instructions and data for processing by the CPU 112, including a plurality of telephone numbers 118 of an address book. Such telephone numbers 118 can be emergency telephone numbers or telephone numbers commonly dialed by the user. Although the memory 116 shown in FIG. 1 is shown as a single unit, it is to be appreciated that one skilled in the art can provide the wireless communication device 101 with a plurality of memories 116. Also, one or more of the memories 116 can be located externally, such as at a cell site (not shown), such that as the externally located memories 116 are accessible by the wireless communication device 101.

The wireless communication device 101 also includes an audio input device, such as a microphone 120 and an audio output device, such as a speaker 122. The microphone 120 and the speaker 122 operate to provide two-way audio communication using the wireless communication device 101. The speaker 122 is driven by driving signals generated by an output driver 124. The driving signals provided by the output driver 124 are converted by the speaker 122 into audible signals to transmit the voice of the caller to the user, or to produce audible cues that inform the user when an incoming call is being received and when an outgoing call is being made. An alert circuit 126 can act in conjunction with the output driver 124 or the speaker 122 to create the audible cues and other alerts. Examples of alerts that can be created by the alert circuit 126 include a ring that alerts the user of an incoming call, audible signals or tones to indicate each time a key on the wireless communication device 101 is pressed, and recorded or synthesized human voices that enunciate a key name of a pressed/activated key (e.g., a "talking key"). These various audio outputs will be described in further detail below.

The wireless communication device 101 also includes a display 128 to conveniently display settings of the wireless communication device 101, such as volume control and ringer selection settings, and user-entered data, such as destination telephone numbers and alphanumeric text. This information can appear visually on a menu 130 on the display 128.

A keypad 132 is attached to the housing 102 for operation by the user. The keypad 132 provides a convenient input device by which destination telephone numbers, commands, and alphanumeric information may be entered by the user. In an exemplary embodiment, the speaker 124 or alert circuit 126 provides distinctive and different audio signals for each of the keys on the keypad 132 when the keys are pressed, as opposed to the indistinguishable monotone beeps provided by conventional telephones or conventional wireless communication devices.

The various components of system 100 are coupled together by a bus system 134 of the wireless communication device 101, which may include a power bus, control bus, and status signal bus in addition to a data bus. However, for the sake of clarity, the various buses are illustrated in FIG. 1 as the bus system 134.

Figure 2:
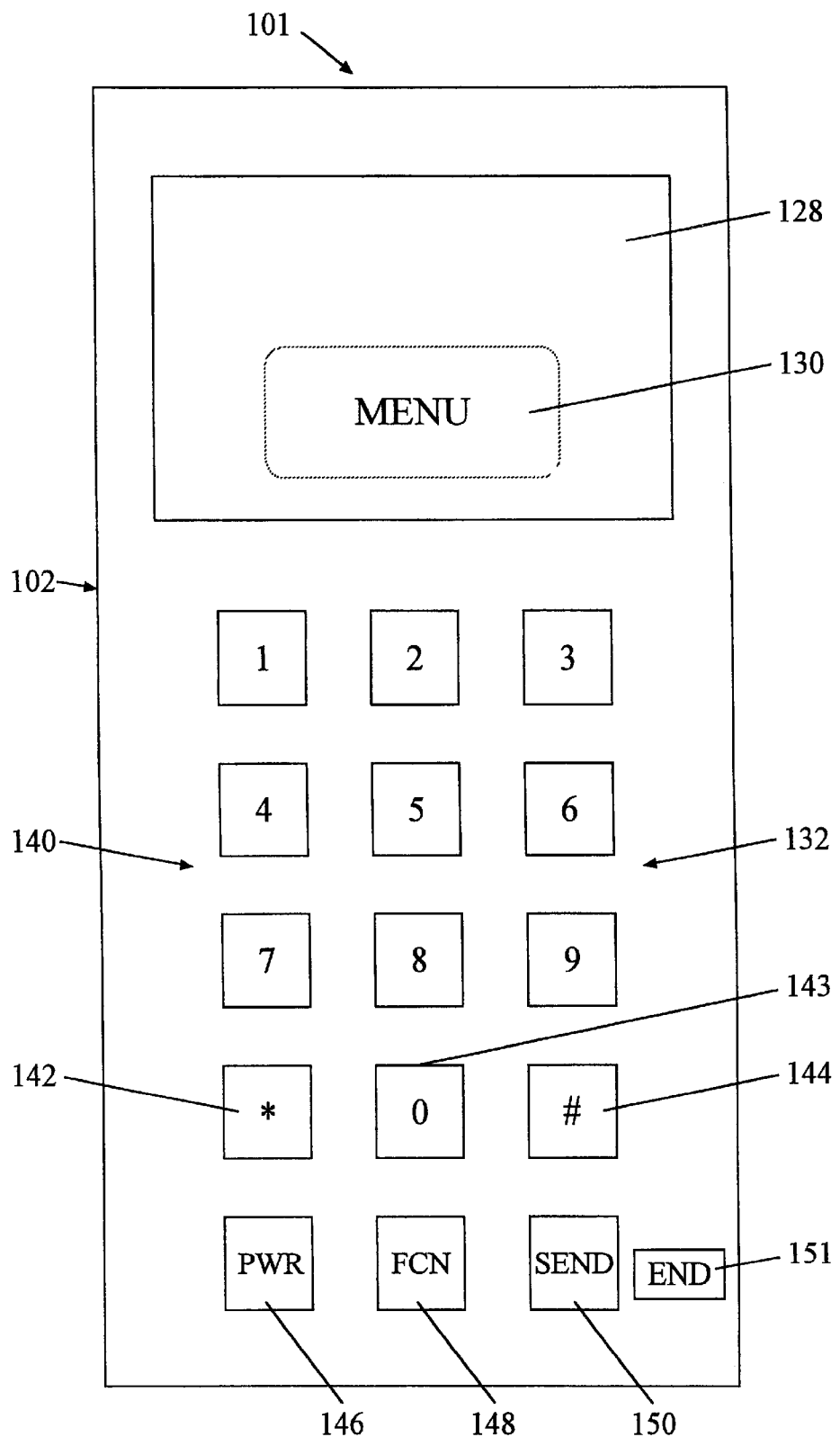
FIG. 2 shows an embodiment of a keypad and a display for the wireless communication device of FIG. 1.

FIG. 2 shows an embodiment of the keypad 132 and the display 128 of the wireless communication device 101. A plurality of keys 140 of the keypad 132 are operatively mounted on the housing 102. The keys 140 comprise numerals 1–9, and can include a * key 142, a 0 key 143, and a # key 144. The keypad 132 also has a POWER key 146 that turns the wireless communication device 101 ON or OFF. A function (FCN) key 148 allows the user to enter different modes for the wireless communication device 101 or to change/check operational settings of the wireless communication device 101. A SEND key 150 is pressed to place a call to destination (e.g., to transmit a destination telephone number) after the numbers of the destination telephone number have been entered using the keypad 132. An END key 151 is pressed to terminate an ongoing communication.

As discussed above, conventional wireless communication devices provide indistinguishable monotone signals, or no audible signals at all, whenever one of the keys 140–151 on the keypad 132 is pressed. However, an exemplary embodiment of the present invention provides a wireless communication device 101 that has distinctive or unique audible signals assigned to each of the keys 140–151 of the keypad 132. Thus, this allows a user to differentiate one key from another based on the sound that a key provides when it is pressed. Further, embodiments of the present invention allow information (e.g., the telephone numbers 118) viewed on the menu 130 of the display 128 to also be assigned with distinctive and unique audible signals if the information is displayed on the menu 130.

FIG. 3 is a table identifying illustrative audible signals that can be assigned to the keys 140–144 of the keypad 132. The table of FIG. 3 can be embodied in a data structure (such as a lookup table) stored in the memory 116, or the table of FIG. 3 can be a part of a software routine. The table of FIG. 3 or any of its contents is accessible by the CPU 112. A person skilled in the art would know how to configure and program the wireless communication device 101 based on the information provided in the table of FIG. 3.

The table of FIG. 3 is now described. Numerical keys 1, 2, and 3, which are in the top row of the plurality of keys 140, are assigned a HIGH tone 158. Numerical keys 4, 5, and 6, which are in the middle row of the plurality of keys 140, are assigned a MEDIUM tone 160. Numerical keys 7, 8, and 9, which are in the next lower row of the plurality at keys 140, are assigned a LOW tone 162. Numerical keys 1, 4, and 7, which are in the first column of the plurality of keys 140, produce one beep (e.g., one audible pulse) 152 of the HIGH tone 158, the MEDIUM tone 160, and the LOW tone 162, respectively. Numerical keys 2, 5, and 8, which are in the second column of the plurality of keys 140, produce two beeps 154 of the HIGH tone 158, the MEDIUM tone 160, and the LOW tone 162, respectively. Numerical keys 3, 6, and 9 which are in the third column of the plurality of keys 140, produce three beeps 156 of the HIGH tone 158, the MEDIUM tone 160, and the LOW tone 162, respectively.

Thus, the relative frequency and number of beeps correspond to the row and column of each numerical key 1–9 of the plurality of keys 140. For example, if the numerical key 5 of the keypad 132 is pressed by the user, two beeps 154 of the MEDIUM tone 160 would be provided as an audible signal feedback to the user. If the numerical key 9 is pressed by the user, then three beeps 156 of the LOW tone 162 would be heard by the user.

The description provided herein designate the various tones as "HIGH," "MEDIUM," and "LOW." It is to be appreciated that these designations are merely illustrative and relative to each other. For instance, the HIGH tone 158 may have a higher frequency when compared to a frequency of the LOW tone 162, with the MEDIUM tone 160 having a frequency somewhere in between. Further, HIGH, LOW, and MEDIUM can alternatively signify volumes of the tones instead their frequency. It is also possible to use three other types of sounds that cannot be classified under the three HIGH, LOW, and MEDIUM designations used herein. That is, a bell, a whistle, and a click can be used as the three differentiating audible signals. Consequently, the present invention is not limited by the type of audible signal.

The * key 142 is assigned a rising tone 164. The rising tone 164 can be, for example, a tone that starts softly in volume and then gradually rises to a loud volume. The rising tone 164 may also start at a low frequency and increase to a high frequency. The 0 key 143 is assigned a long tone 166. The long tone 166 can be, for example, a tone that remains constant in volume for an extended period of time as compared to the other tones. The # key 144 is assigned a falling tone 168. The falling tone 168 can be, for example, a tone that starts with a loud volume and then gradually decreases to a soft volume. The falling tone 168 may also start at a high frequency and decrease to a low frequency.

FIG. 4 is a table identifying additional illustrative audible signals assigned to other features of the wireless communication device 101. If the wireless communication device has a volume control 170 that allows the user to change a volume of the speaker 122, then the volume control 170 can be provided with a volume-varying tone 174. That is, if the user changes the volume control 170 to raise or lower the volume of the speaker 122, then the output driver 124 provides a unique output signal to the speaker 122 that causes the volume-varying tone 174 to correspondingly lowers or raises its volume. Thus, the output signal and the volume-varying tone 174 are altered as the volume control 170 is changed. It should be noted that the volume control 170 can also be used to change volume levels of other components of the wireless communication device 101. For example, the volume control 170 can be used to raise or lower a volume of an alert (e.g., a ring that indicates an incoming telephone call or an audible signal such as those of FIG. 3 that is generated whenever a key 140–151 is pressed) provided by the alert circuit 126.

If the wireless communication device 101 has a ringer selector 172, then various ringer settings (e.g., various audiovisual alerts that indicate an incoming telephone call, such as a bell ring, a pulse, a beep, a vibrating alert, lighted indicators on the display 128, etc.) can also be associated with different ringer tones 176. Therefore, if the user wishes to scroll through and view the menu 130 to change ringer settings, then each of the ringer settings can produce a distinctive ringer tone 176 as the ringer setting is displayed on the menu 130. The ringer tones 176 can be as simple as the sound of the alerts themselves, or the ringer tones 176 can be any other audible signal.

If the wireless communication device 101 has an address book of telephone numbers 118 stored in the memory 116, then each of the telephone numbers can be assigned at 178 with unique tones, or the individual digits within the telephone numbers can be assigned and programmed to generate the audible signals identified in the table of FIG. 3. Thus, whenever the user retrieves a telephone number from the memory 116 (or scrolls through the menu 130) and then the telephone number is subsequently displayed on the menu 130, the unique tones or sequence of tones 178 associated with that telephone number will also be generated once the telephone number appears on the menu 134. Further, the wireless communication device 101 can be programmed such that when a call is placed to that telephone number, the unique tones or sequence of tones 178 of the telephone number is played to the user by the speaker 122 to indicate to the user that the telephone number is being dialed.

The table of FIG. 4 also shows that the POWER key 146, the function key 148, the SEND key 150, and the END key 151 are also respectively assigned unique tones 180–185. Thus, whenever each of these keys are pressed by the user, a different audible signal is heard by a user to distinguish one key from another.

The numerical keys 1–9 of the keys 140 can also have other audible signals aside from those shown in the table of FIG. 3. For example, these numerical keys 1–9 can produce a series of numbered beeps 186 corresponding to the numerical value of the numerical keys 1–9. That is, if the numerical key 8 is pressed, the user would hear a series of eight beeps.

In another alternative embodiment, the 0–9, #, *, POWER, function, SEND, and END keys 140–151 can produce enunciated key names 188 when they are pressed. For instance, when the numerical key 5 is pressed, the speaker 124 will play a voice that says "five." Similarly, when the * key 142 is pressed, the speaker 124 will play a voice that says "star." These "talking keys" can be programmed by pre-recording or synthesizing human voices and storing them in the memory 116. Other alternative embodiments include a combination of talking keys and the sequence of tones shown in the table of FIG. 3. Accordingly, it is possible to program the wireless communication device 101 with many combinations and types of audible signals. Therefore, the invention is not limited by the particular type of audible signal. Rather, what is important is that the audible signals be distinguishable for each other, or otherwise distinguishable so as to allow the user to audibly and intuitively navigate through the keypad 132.

An illustrative operation of the wireless communication device 101 is now described with reference to FIGS. 1–3. When the user presses one of the keys 140, such as when the caller is dialing a telephone number, the CPU 112 detects that a key has been pressed and identifies the key. In response to the pressing/activation of this key, the CPU 112 uses the table of FIG. 3 stored in the memory 116 to determine and select the unique audible signal corresponding to that key. Once the corresponding audible signal is located in the memory 116, the CPU 112 triggers the output driver 124 to provide driving signals (e.g., a unique output signal) to the speaker 122. The unique output signal corresponds to the unique audible signal, and result in the speaker 122 playing the unique audible signal corresponding to the activated key. This process is then repeated for each key 140–151 of the keypad 132 that is subsequently pressed by the user.

Thus, an apparatus and method for intuitive audio keypad navigation for a wireless communication device 101 has been described. From the foregoing, many modifications and changes can be made to the invention based on the disclosure herein. The above description of illustrated embodiments of the invention is not intended to be exhaustive or to limit the invention to the precise forms disclosed. While specific embodiments of, and examples for, the invention are described herein for illustrative purposes, various equivalent modifications, such as those described above, are possible within the scope of the invention, as those skilled in the relevant art will recognize. The teachings provided herein of the invention can be applied to other communication systems and devices, not necessarily the illustrative wireless communication device described above.

In general, in the following claims, the terms used should not be construed to limit the invention to the specific embodiments disclosed in the specification and the claims. Instead the scope of the invention is to be determined entirely by the following claims, which are to be construed in accordance with established doctrines of claim interpretation.

What is claimed is:

1. A wireless communication device, comprising:

a keypad having a plurality of keys;

a processor coupled to the keypad;

an output driver coupled to the processor, the processor responsive to activation of the plurality of keys by a user to trigger the output driver to generate a unique output signal corresponding to each of the plurality of keys; and an audio output device responsive to a triggering of the output driver by the processor to provide audible signals corresponding to the unique output signal, wherein user activation of a selected one of the plurality of keys results in a generation of a unique audible signal corresponding to the activated key, and the audible signals comprise a number of tones, the number of tones corresponding to a numerical value of an associated key.

2. A method of operating a wireless communication device, the method comprising:

providing a keypad having a plurality of keys;

activating one of the plurality of keys;

generating a unique output signal corresponding to the one key and in response to activation of the one key; and responding to the unique output signal by providing a unique audible signal corresponding to the activated key, wherein responding to the unique output signal by providing the unique audible signal includes providing a number of tones, the number of tones corresponding to a numerical identity of the activated key.

3. A medium having stored thereon a data structure for a wireless communication device, the wireless communication device including a keypad having a plurality of keys thereon, the data structure comprising:

a plurality of data fields corresponding to the plurality of keys, each of the data fields containing data representing a unique sound associated with each of the plurality of keys; and a selector data field to select one of the plurality of data fields in response to user activation of the associated one of the plurality of keys, wherein the plurality of data fields comprises a numerical value corresponding to each of the keys, the numerical value further corresponding to a number of pulses of the unique sounds.

* * * * *